UNITED STATES PATENT OFFICE.

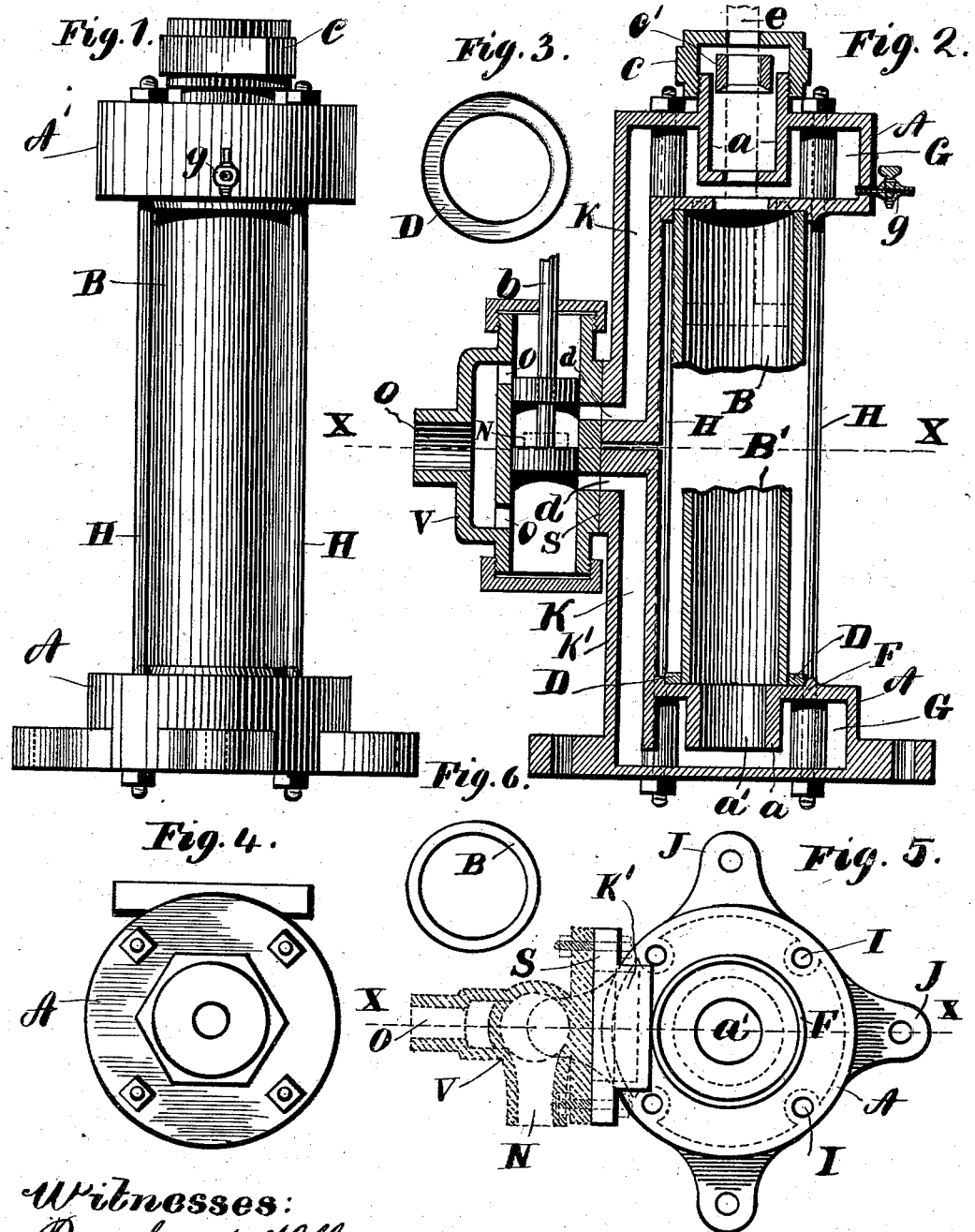

WILLIAM ROSS, OF TROY, NEW YORK.

CYLINDER FOR HYDRAULIC MOTORS.

SPECIFICATION forming part of Letters Patent No. 382,389, dated May 8, 1888.

Application filed June 9, 1887. Serial No. 240,701. (No model.)

*To all whom it may concern:*

Be it known that I, WILLIAM ROSS, a resident of the city of Troy, in the county of Rensselaer and State of New York, have invented certain new and useful Improvements in Cylinders for Hydraulic Motors; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in cylinders for hydraulic motors, and particularly water-engine cylinders; and it consists of the novel construction of the cylinder body and heads, and combination of parts, hereinafter described, and pointed out in the claims.

The objects of the invention are made apparent in connection with the following description.

Figure 1 of the drawings is a front elevation of a completed cylinder embodying my improvements. Fig. 2 is a vertical central section extending from front to rear of the device, as shown in Fig. 1, and along the broken line X X in Fig. 5; also showing a corresponding section of a cylinder-port valve attached; also the broken ends of two interchangeable cylinder-tubes of different diameters. Fig. 3 is a plan view of a cylinder-guide ring. Fig. 4 is a top plan view of the device, as shown in Fig. 1. Fig. 5 is a top plan view of the lower cylinder-head detached, showing in dotted lines a section of the valve, taken on broken line X X in Fig. 2, attached. Fig. 6 is an end view of the tube forming the body of the cylinder.

The cylinder-covers A A' are linked together by the bolts or rods H, passing through holes I, in such a manner as to support the interposed tube or cylinder B and cover its open ends. The heads are each preferably made of metal cast in a single piece, and provided exteriorly with a cylinder-guide flange, F, and a leg or stem, K', projecting from the cylinder-face of the head. The ends of the stems are provided with faces S, forming seats for a common valve, V. (Shown in cross-section in Fig. 2 and by dotted lines in Fig. 5.)

The cylinder-body consists of a piece of straight unflanged tubing, B, the ends of which are adapted to rest upon the faces of the heads within the flanges F, which guide the cylinder ends to their proper places.

The heads are provided interiorly with an air-chamber, G, opening into a water-duct, K, leading through aperture a' from the ends or ports of the cylinder-body to the valve-ports through suitable apertures, d, in the valve-case seat S. The alternate movements of the valve-stem b alternately open and close the inlet-port N and the outlet-port O of the valve for the ingress and egress of water to and from the piston (shown by dotted lines in Fig. 2) in the usual well-known manner.

By projecting the walls a, surrounding the openings a' in the heads, interiorly to a point near the bottom of the air-chamber, the inclosed air is prevented from escaping with the inflowing water into the cylinder, and by similarly extending the interior wall of duct K the air is prevented from escaping with the outflowing water passing from the cylinder. I am thus able to secure within the heads, and with comparatively little or no expense, an air-cushion, the use of which in connection with water-engines is well understood, its object being to prevent too great strain upon the various parts of the engine by means of the inertia of a moving non-compressible fluid, as water. The head through which the piston-rod e passes is provided with an aperture on the back or upper side, adapted to receive the rod and the usual packing, C'. This aperture is also provided with a projecting threaded flange adapted to receive the usual stuffing-nut, C.

The advantage of bolting or linking together upon the ends of the cylinder-tube the two heads provided with valve-case seats and ducts leading from said seats to the ports or ends of the cylinder-tube is, that a straight unflanged section of ordinary tubing may be employed for the body of the cylinder, thus avoiding the necessity of boring or fitting up a cylinder-casting, and the valve-case seats upon the two heads can be easily and upon the first trial brought into exact alignment to receive the common valve-case, V, which could not be easily accomplished if the heads were screwed onto the ends of the cylinder-tube; also, that by loosening the nuts upon one end of bolts H the cylinder-tube can be easily detached and another differing in diameter substituted therefor, thereby varying the capacity of the engine without any other change than that of substituting cylinder tubes and pistons of varying diameters. The faces of the heads may be provided with circular grooves of different diameters adapted to receive the ends of corresponding tubes. One such groove is indicated by dotted lines in the upper head in Fig. 2. I prefer, however, to make use of loose detachable rings D, which can be easily made of any required internal diameter to receive a tube of the desired size. The ring is inserted between the tube and the fixed guide-flange F, as shown in the lower part of Fig. 2, which represents the broken end of a tube, B', smaller in diameter than tube B, in position. The ring serves to guide and retain the tube in its proper place upon the heads.

The air-chambers may be provided with a small cock, as g, adapted to discharge any accumulation of water in the bottom of the air-chamber, and thereby fill the chamber with air. The lower head may also be provided with perforated lugs or feet J, by which the cylinder can be bolted to a supporting-base.

What I claim as new, and desire to secure by Letters Patent, is—

1. The combination, with a straight unflanged tube or cylinder, of tube-supporting end covers or heads linked together, each being provided with a valve-case seat, and duct leading from said seat to a cylinder-port, said seats being arranged in alignment and forming together a seat for a common valve-case, substantially as described, and for the purposes set forth.

2. The combination, with a straight unflanged tube or cylinder, of detachably-connected end-supporting covers or heads, each provided with a cylinder-port leading to a valve-case seat, and a fixed guide-flange, substantially as described, and for the purposes set forth.

3. The combination, with a straight unflanged tube or cylinder, of detachably-connected end-supporting covers or heads, each provided with a cylinder-port leading to a valve-case seat, and a fixed guide-flange and a detachable guide-ring, substantially as described, and for the purposes set forth.

4. The combination, with a cylinder-tube, of tube-supporting end covers or heads linked together, each head being a single piece of metal cast with a valve-case seat, and an air-chamber opening into a duct leading from one end of said tube to said valve-case seat, substantially as described, and for the purposes set forth.

In testimony whereof I have hereunto set my hand this 1st day of June, 1887.

WILLIAM ROSS.

Witnesses:
GEO. A. MOSHER,
CHAS. L. ALDEN.